(12) United States Patent
Goto

(10) Patent No.: US 7,978,947 B2
(45) Date of Patent: Jul. 12, 2011

(54) PHOTONIC BANDGAP FIBER

(75) Inventor: Ryuichiro Goto, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/550,024

(22) Filed: Aug. 28, 2009

(65) Prior Publication Data

US 2009/0317041 A1    Dec. 24, 2009

Related U.S. Application Data

(63) Continuation of application No. PCT/JP2008/053952, filed on Mar. 5, 2008.

(30) Foreign Application Priority Data

Mar. 5, 2007  (JP) .................................. 2007-054273
Jun. 5, 2007  (JP) .................................. 2007-149181

(51) Int. Cl.
*G02B 6/032* (2006.01)

(52) U.S. Cl. ........ 385/125; 385/123; 385/124; 385/126; 385/127

(58) Field of Classification Search .................. 385/123, 385/124, 125, 126, 127
See application file for complete search history.

(56) References Cited

U.S. PATENT DOCUMENTS

| | | | |
|---|---|---|---|
| 6,404,966 B1 | 6/2002 | Kawanishi et al. | |
| 7,174,078 B2 * | 2/2007 | Libori et al. ................. | 385/125 |
| 7,190,869 B2 | 3/2007 | Jin et al. | |
| 2001/0017967 A1 | 8/2001 | Hirano et al. | |
| 2001/0026667 A1 | 10/2001 | Kawanishi et al. | |
| 2005/0084223 A1 | 4/2005 | Tanaka et al. | |
| 2006/0034575 A1 | 2/2006 | Sako et al. | |
| 2006/0159410 A1 | 7/2006 | Saito et al. | |
| 2006/0257071 A1 | 11/2006 | Bise et al. | |

FOREIGN PATENT DOCUMENTS

| | | |
|---|---|---|
| EP | 1477829 A1 | 11/2004 |
| JP | 1-147412 A | 6/1989 |
| JP | 2000-35521 A | 2/2000 |
| JP | 2002-237637 A | 8/2002 |

(Continued)

OTHER PUBLICATIONS

Takatoshi Kato et al., "Dispersion Shifted Fiber for WDM Transmission" IEICE Technical Report, OSC, Hikari Tsushin System, Nov. 1, 1996, pp. 43-48, No. 335.

(Continued)

*Primary Examiner* — Jennifer Doan
(74) *Attorney, Agent, or Firm* — Sughrue Mion, PLLC

(57) ABSTRACT

A photonic bandgap fiber includes a first core having a refractive index equal to or smaller than a refractive index of a cladding, a second core that is provided to surround the first core and has a refractive index smaller than the refractive index of the first core, the cladding that surrounds the second core, and a periodic structure portion that is provided in the cladding around the second core, and in which high-refractive index portions having a refractive index larger than the refractive index of the cladding form a periodic structure. The periodic structure is configured such that at least the propagation constant of the fundamental mode at a wavelength to be used is in a photonic bandgap, and the propagation constant of a higher-order mode at the wavelength to be used is outside of the photonic bandgap.

6 Claims, 13 Drawing Sheets

FOREIGN PATENT DOCUMENTS

| JP | 2003-075657 A | 3/2003 |
| --- | --- | --- |
| JP | 2003-222739 A | 8/2003 |
| JP | 2003-229618 A | 8/2003 |
| JP | 2005-025056 A | 1/2005 |
| JP | 2005-202440 A | 7/2005 |
| JP | 2006-011328 A | 1/2006 |
| JP | 2006-126725 A | 5/2006 |
| JP | 2006-139018 A | 6/2006 |
| JP | 2007-033466 A | 2/2007 |
| WO | 00/42458 A1 | 7/2000 |
| WO | 00/62106 A1 | 10/2000 |
| WO | 03/065089 A1 | 8/2003 |

OTHER PUBLICATIONS

Ryuichiro Goto et al., "Silica-Based Wide-Band Solid Photonic Band Gap Fiber", 2006 Nen IEICE Information and System Society Conference Koen Ronbunshu 2, Sep. 7, 2006, p. 322.

Ryuichiro Goto et al., "Silica-based Wide-band Solid Photonic Band Gap Fiber", Technical Report of IEICE,, OCS, Optical Communication System, Aug. 17, 2006, vol. 106, No. 210, pp. 39-42, with partial English translation thereof.

J. D. Love et al., "Radiation from single-mode helical fibers", Electronics letters, vol. 23, No. 21, pp. 1109-1110, 1987.

John M. Fini "Design of solid and microstructure fibers for suppression of higher-order modes", Optics Express, vol. 13, No. 9, p. 3477, 2005.

L. Lavoute et al. "Design of microstructure single-mode fiber combining large mode area and high rare earth ion concentration", Optics Express, vol. 14, No. 7, p. 2994, 2006.

Takayoshi Kato et al., "Ultra Low Nonlinearity Low Loss Pure Silica Core Fiber for Long-Haul WDM Transmission", Proceedings of the Electronics, Information and Techniques society Conference of IEICE 1, Aug. 16, 1999, p. 182, C-3-76, with partial English Translation thereof.

Tetsuya Miki et al., "Photonic Technology Handbook", Optics Co., Ltd, Jan. 30, 2002, first impression of the first edition, pp. 196-198, with partial English translation thereof.

Takayoshi Kato et al. "Dispersion Shifted Fiber for WDM Transmission", IEICE Technical Report, OSC, Hikari Tsusin System, Nov. 1, 1996, pp. 43-48, No. 335, with partial English translation thereof.

Ryuichiro Goto et al., "Silica-Based Wide-Band Solid Photonic Band Gap Fiber", 2006 Nen IEICE Information and System Society Conference Koen Ronbunshu 2, Sep. 7, 2006, p. 322, B-13-15, with partial English translation thereof.

Fevrier S et. al. :"Low-loss singlemode large mode area all-silica photonic bandgap fiber" Optics Express, OSA (Optical Society of America), Washington DC, (US) LNKD- DOI: 10.1364/OPEX.14.000562, vol. 14, No. 2, Jan. 23, 2006, pp. 562-569.

Brechet F et. al. :"Analysis of bandpass filtering behaviour of singlemode depressed-core-index photonic-bandgap fibre" Electronics Letters, IEE Stevenage, GB LNKD-DOI:10.1049/EL:20000675, vol. 36, No. 10, May 11, 2000, pp. 870-872.

Tanigawa S et. al.:"Bend sensitive wavelength filtering in concentric core solid photonic bandgap fibre" Opto-Electronics and Communications Conference, 2008 and the 2008 Australian Conference on Optical Fibre Technology. OECC/ACOFT 2008. Joint Conference of the, IEEE, Piscataway, NJ, USA, Jul. 7, 2008, pp. 1-2.

Min Yan et. al. :"Loss property of photonic bandgap fiber made of high-index cylinders in low-index host material" Communications, Circuits and Systems, 2004. ICCCAS 2004. 2004 International Conference on Chengdu, China Jun. 27-29, 2004, Piscataway, NJ, USA, IEEE, US LNKD-DOI:10.1109/ICCCAS.2004.1346248, Jun. 27, 2004, vol. 1, pp. 656-659.

Steinvurzel P et. al.: "Continuously tunable bandpass filtering using high-index inclusion microstructured optical fibre" Electronics Letters, IEE Stevenage, GB LNKD-DOI:10.1049/EL:20050037, vol. 41, No. 8, Apr. 14, 2005 , pp. 463-464.

Goto, Ryuichiro et al, "Single-polarization operation in birefringent all-solid hybrid microstructured fiber with additional stress applying parts", Optics Letters, OSA, Optical Society of America, vol. 34, No. 20, Oct. 15, 2009, p. 3119-3121.

\* cited by examiner

PHOTONIC BANDGAP FIBER

TECHNICAL FIELD

The present invention relates to a photonic bandgap fiber, in particular, to a photonic bandgap fiber having a function to suppress propagation of higher-order modes.

Priority is claimed on Japanese Patent Application No. 2007-54273, filed Mar. 5, 2007, and Japanese Patent Application No. 2007-149181, filed Jun. 5, 2007, the contents of which are incorporated herein by reference.

BACKGROUND ART

In recent years, a high-power fiber laser using a rare-earth-doped fiber has been attracting public attention. The high-power fiber laser is configured such that, while pump light and signal light are propagating through a fiber, the signal light is amplified by the pump light. The high-power fiber laser has advantages such as ease of cooling and reduction in size.

In such a high-power fiber laser, in order to suppress non-linear effects, a fiber having a large mode field diameter (MFD) is used. However, if the mode field diameter is simply increased, higher-order modes may propagate. The propagation of the higher-order modes may cause deterioration of beam quality. For this reason, there is a need for a method that is capable of suppressing propagation of higher-order modes.

Non-Patent Documents 1 and 2 are examples of related art for suppressing propagation of higher-order modes.

These documents disclose techniques in which higher-order modes propagating through a core having a refractive index larger than a cladding are coupled to a mode propagating into an area around the core with a raised refractive index, thereby suppressing propagation of higher-order modes through the core.

[Non-Patent Document 1] "Design of solid and microstructure fibers for suppression of higher-order modes," Optics express, Vol. 13, No. 9, pp. 3477, 2005

[Non-Patent Document 2] "Design of microstructured single-mode fiber combining large mode area and high rare earth ion concentration," Optics express, Vol. 14, No. 7, pp. 2994, 2006

DISCLOSURE OF THE INVENTION

Problems to be Solved by the Invention

However, the above-described techniques have the following problems.

According to the techniques disclosed in Non-Patent Documents 1 and 2, a mode propagating around the core also propagates through the fiber. Accordingly, the mode is recoupled to a mode propagating through the core, and is returned to the core. For this reason, in the techniques disclosed in Non-Patent Documents 1 and 2, the effect of suppressing propagation of higher-order modes is limited.

The present invention was made in view of the above circumstances, and has an object of providing a fiber that is capable of reducing the propagation loss of the fundamental mode and increasing the propagation loss of higher-order modes whose propagation needs to be suppressed.

Means for Solving the Problem

According to an aspect of the invention, a photonic bandgap fiber includes: a first core having a refractive index equal to or smaller than a refractive index of a cladding; a second core that is provided to surround the first core and has a refractive index smaller than the refractive index of the first core; the cladding that surrounds the second core; and a periodic structure portion that is provided in the cladding around the second core, high-refractive index portions having a refractive index larger than the refractive index of the cladding form a periodic structure. The periodic structure is configured such that at least the propagation constant of the fundamental mode at a wavelength to be used is in a photonic bandgap, and the propagation constant of a higher-order mode at the wavelength to be used is outside of the photonic bandgap.

In the photonic bandgap fiber according to the aspect of the invention, it is preferable that the periodic structure portion include a plurality of the high-refractive index portions that are arranged to form a structure including at least one of a triangular lattice structure, a honeycomb lattice structure, a square lattice structure, and a rectangular lattice structure.

In the photonic bandgap fiber according to the aspect of the invention, it is preferable that the first core have a circular cross section.

In the photonic bandgap fiber according to the aspect of the invention, it is preferable that the high-refractive index portion, the first core, and the second core have no air holes.

In the photonic bandgap fiber according to the aspect of the invention, it is preferable that the relative refractive-index difference of the first core with respect to the cladding be in the range of −1.0% to 0.0%, and the relative refractive-index difference of the second core with respect to the cladding be in the range of −1.5% to −0.01%.

In the photonic bandgap fiber according to the aspect of the invention, it is preferable that the maximum relative refractive-index difference of the high-refractive index portion with respect to the cladding be in the range of 0.5% to 4.0%.

Advantageous Effects of the Invention

According to the photonic bandgap fiber of the invention, the periodic structure portion is provided around the first and second cores. Therefore, it is possible to reduce the propagation loss of the fundamental mode, and to increase the propagation loss of the higher-order modes whose propagation needs to be suppressed.

According to the photonic bandgap fiber of the invention, the refractive index of the first core is equal to or smaller than the refractive index of the cladding, and the refractive index of the second core is smaller than the refractive index of the cladding. Therefore, the guiding principle is based on the photonic bandgap effect, thus, in principle, a phenomenon in which the electrical field of a mode propagating in the core couples to a mode propagating in the periodic structure portion and then recouples to a mode propagating in the core does not occur. As a result, an effect of filtering higher-order modes can be higher.

EXPLANATION OF REFERENCE NUMERALS

10, 100, 120: CLADDING
11, 101, 121: FIRST CORE
12, 102, 122: SECOND CORE
13, 103, 123: HIGH-REFRACTIVE INDEX PORTION

BEST MODE FOR CARRYING OUT THE INVENTION

Hereinafter, an embodiment of the invention will be described with reference to the drawings.

Figure 1:
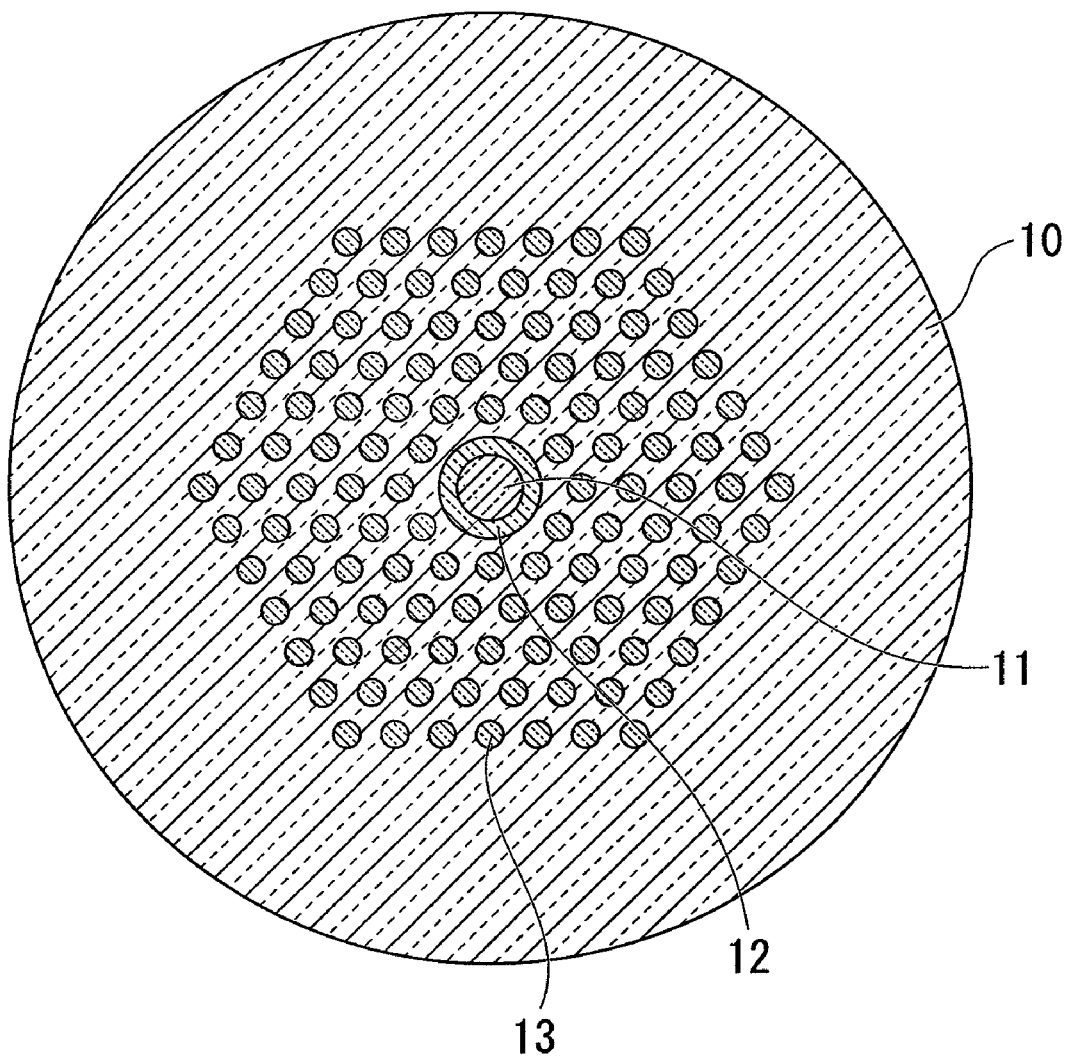
FIG. 1 is a sectional view illustrating a photonic bandgap fiber according to one embodiment of the invention.

FIG. 1 is a diagram illustrating a photonic bandgap fiber according to an embodiment of the invention.

The photonic bandgap fiber of this embodiment includes a first core 11 having a refractive index equal to or smaller than a refractive index of a cladding 10, a second core 12 that is provided to surround the first core 11 and has a refractive index smaller than the refractive index of the first core 11, the cladding 10 that surrounds the second core 12, and a periodic structure portion that is provided in the cladding 10 around the second core 12, and has a plurality of high-refractive index portions 13 which have a refractive index larger than the refractive index of the cladding 10 and are periodically arranged in a trianglular lattice shape to form a triangular lattice structure.

In the photonic bandgap fiber of this embodiment, the propagation constant of the fundamental mode is in a photonic bandgap defined by the periodic structure, and the propagation constant of higher-order modes whose propagation needs to be suppressed is outside of the photonic bandgap. In this case, the photonic bandgap enhances confinement of the fundamental mode but it does not enhance confinement of the higher-order modes whose propagation needs to be suppressed.

Therefore, by providing the periodic structure portion in a fiber of a basic structure which has no periodic structure portion and exhibits a large propagation loss with respect to the fundamental mode and higher-order modes whose propagation needs to be suppressed, the fundamental mode can selectively propagate with a small propagation loss.

The photonic bandgap fiber of this embodiment may be connected to another fiber, and light may be launched to the photonic bandgap fiber from another fiber as an excitation fiber. In this case, when only modes having a concentric mode field are propagating through the excitation fiber, even if higher-order modes having a non-concentric mode field, such as the LP11 mode and the LP21 mode, can propagate through the photonic bandgap fiber, these modes are not excited. Therefore, if the LP02 mode does not propagate through the photonic bandgap fiber, only the fundamental mode can substantially propagate through the photonic bandgap fiber.

Similarly, if propagation of the LP03 mode is suppressed by the photonic bandgap effect, only the fundamental mode and the LP02 mode can substantially propagate through the photonic bandgap fiber. The same is applied to higher-order modes higher than the LP02 mode.

In the photonic bandgap fiber of this embodiment, the refractive index of the first core 11 is equal to or smaller than the refractive index of the cladding 10, and the refractive index of the second core 12 is smaller than the refractive index of the cladding 10. Therefore, the guiding principle is based on the photonic bandgap effect, thus, in principle, a phenomenon in which the electrical field of a mode propagating in the core couples to a mode propagating in the periodic structure portion and then recouples to a mode propagating in the core does not occur. For this reason, the photonic bandgap fiber of this embodiment can obtain an effect of effectively filtering modes whose propagation constant is outside of the photonic bandgap.

In the photonic bandgap fiber of this embodiment, the first core 11 has a circular cross section. The second core 12 has a thickness large enough to determine the electric field distribution of the fundamental mode primarily by the shapes of the first core 11 and the second core 12 without being substantially influenced by the periodic structure portion, and has a thickness small enough to leak higher-order modes, which are not in the photonic bandgap, to the cladding. That is, the thickness of the second core is larger than the wavelength of light desired for propagation and is smaller than 50 µm. For this reason, the mode field of the fiber of this embodiment has a substantially concentric shape. Since the mode field has a substantially concentric shape, when the fibers are connected to each other, the connection loss does not depend on angle. In addition, the photonic bandgap fiber of this embodiment can be connected to a known optical fiber having a concentric refractive index distribution with a low connection loss.

The photonic bandgap fiber of this embodiment adopts a solid structure in which there is no hole in the high-refractive index portions 13 of the periodic structure portion and the first and second cores 11 and 12. Therefore, when the photonic bandgap fibers are fusion-spliced to each other or the photonic bandgap fiber is fusion-spliced to another optical fiber, unlike in a case in which a hole is provided, hole collapse due to heat does not occur, and thus the fiber structure of an end face of the spliced portion is not changed. As a result, fusion-splicing can be performed with a low loss.

In the photonic bandgap fiber of this embodiment, the first core 11, the second core 12, the high-refractive index portions 13, and the cladding 10 are all made of quartz glass. Therefore, a low-loss fiber can be realized. In addition, the photonic bandgap fiber can be easily fusion-spliced to an optical fiber made of quartz glass, which is widely used at present.

The photonic bandgap fiber of this embodiment can be manufactured by the same method as a known method of manufacturing a photonic bandgap fiber. An example of the manufacturing method will now be described.

In this example, the following materials are prepared.

(1) A quartz glass rod for a core which includes a first core 11 made of quartz glass and a second core 12 made of fluorine-doped quartz glass having a lower refractive index and provided around the first core 11.

(2) A two-layered quartz glass rod that has a center portion made of quartz glass which is doped with germanium serving as the high-refractive index portions 13 and has a refractive index higher than pure quartz glass, and an outer portion made of pure quartz glass and provided around the center portion.

(3) A cylinder made of pure quartz glass, which forms a cladding 10. The cross section of the cylinder may have a circular shape, but the cross section preferably has a hexagonal shape so as to be tightly filled with a quartz rod having a circular cross section.

Next, the inside of the cylinder (3) is filled with the quartz rod (1) for a core and the two-layered quartz glass rods (2) such that the quartz rod (1) for a core is disposed in the center of the cylinder (3) and the two-layered quartz glass rods (2) are disposed around the quartz rod (1) for a core in multi-layers. FIG. 1 illustrates an example where the two-layered quartz glass rods (2) are arranged in five layers.

Next, the filled structure is placed into a vacuum heating furnace and is heated by a heater or the like. Alternatively, the cylinder is sealed with caps mounted at both ends thereof and is then externally heated by an oxyhydrogen flame while the cylinder is evacuated through the caps. In this way, the quartz glass is softened to fill a gap in the cylinder, thereby preparing an optical fiber preform having a structure shown in FIG. 1.

Next, the prepared optical fiber preform is set on a known optical fiber fabrication machine (a fiber drawing machine), and a fiber is drawn in the same manner as a typical optical fiber manufacture, thereby obtaining the photonic bandgap fiber shown in FIG. 1. During fiber drawing, it is preferable that an ultraviolet curable resin be applied to an outer surface of a bare optical fiber, and hereupon an ultraviolet ray be irradiated to cure the resin, thereby forming a coated layer.

This manufacturing method is just an example and is not intended to limit the invention, but various changes and modifications may be made. For example, instead of the two-layered quartz glass rod (2), a high-refractive index quartz glass rod made of quartz glass having a refractive index higher than that of pure quartz glass, and a pure quartz glass rod may be prepared, and the high-refractive index quartz glass rods and the pure quartz glass rods may be alternately filled in the cylinder.

EXAMPLE 1

As an example of the invention, a photonic bandgap fiber having a structure shown in FIG. 1 is manufactured. Within a cladding 10 made of pure quartz glass having a refractive index of 1.45, a first core 11 having a relative refractive-index difference $\Delta 1$ of 0% with respect to the cladding 10 and a diameter d1 of 17.8 µm is provided. A second core 12 having a relative refractive-index difference $\Delta 2$ of −0.36% with respect to the cladding 10 and a diameter d2 of 25 µm is provided around the first core 11. High-refractive index portions 13 having a relative refractive-index difference $\Delta h$ of 1.6% with respect to the cladding 10 and a diameter dh of 5.6 µm are provided around the second core 12 to form a periodic structure which is a triangular lattice structure having a period of 14.0 µm (periodic structure portion). In the periodic structure, two layers at the center are not provided in order to form a core, and a five-layered periodic structure is formed.

Figure 2:
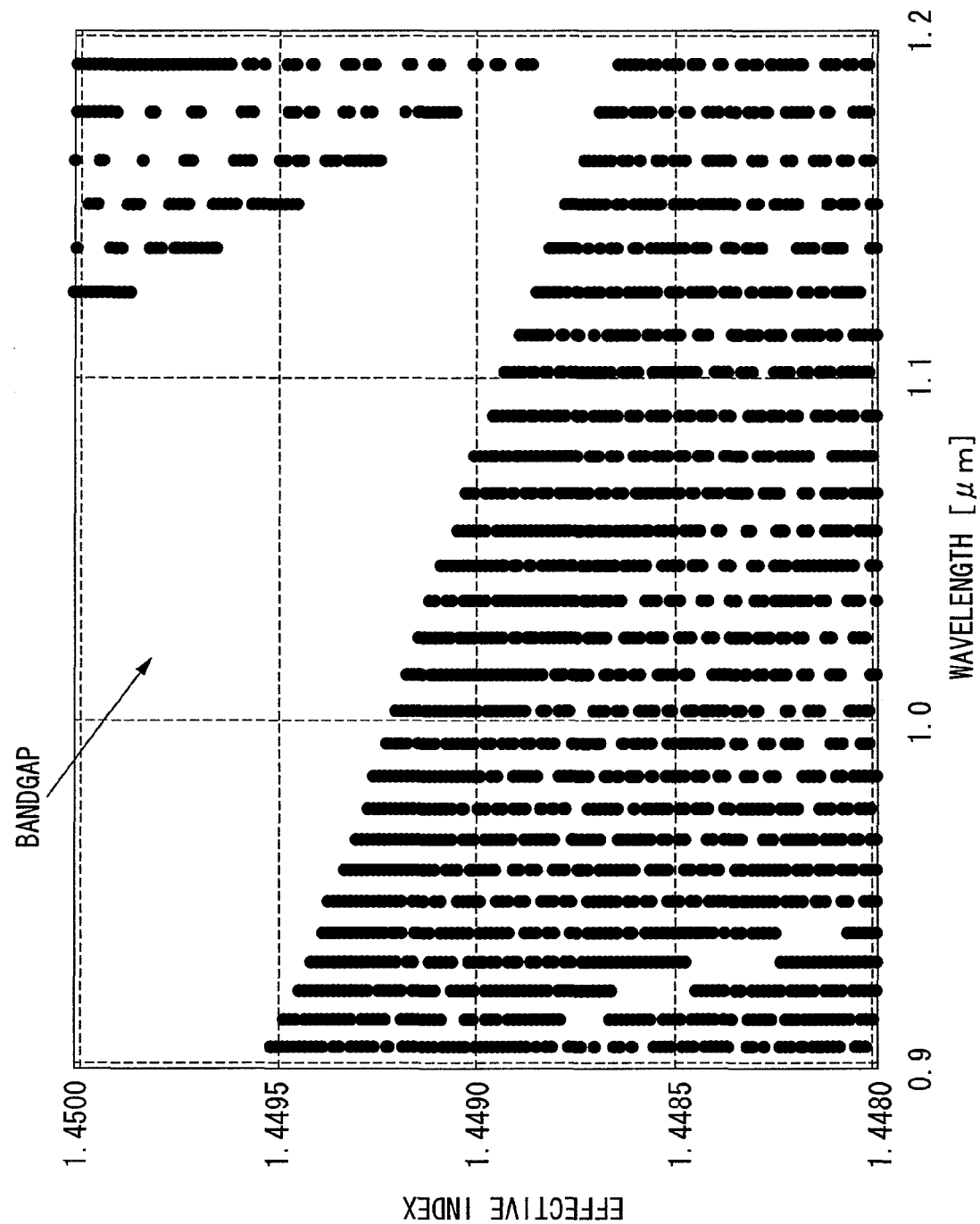
FIG. 2 is a band diagram of a photonic bandgap fiber manufactured in Example 1.
Figure 3:
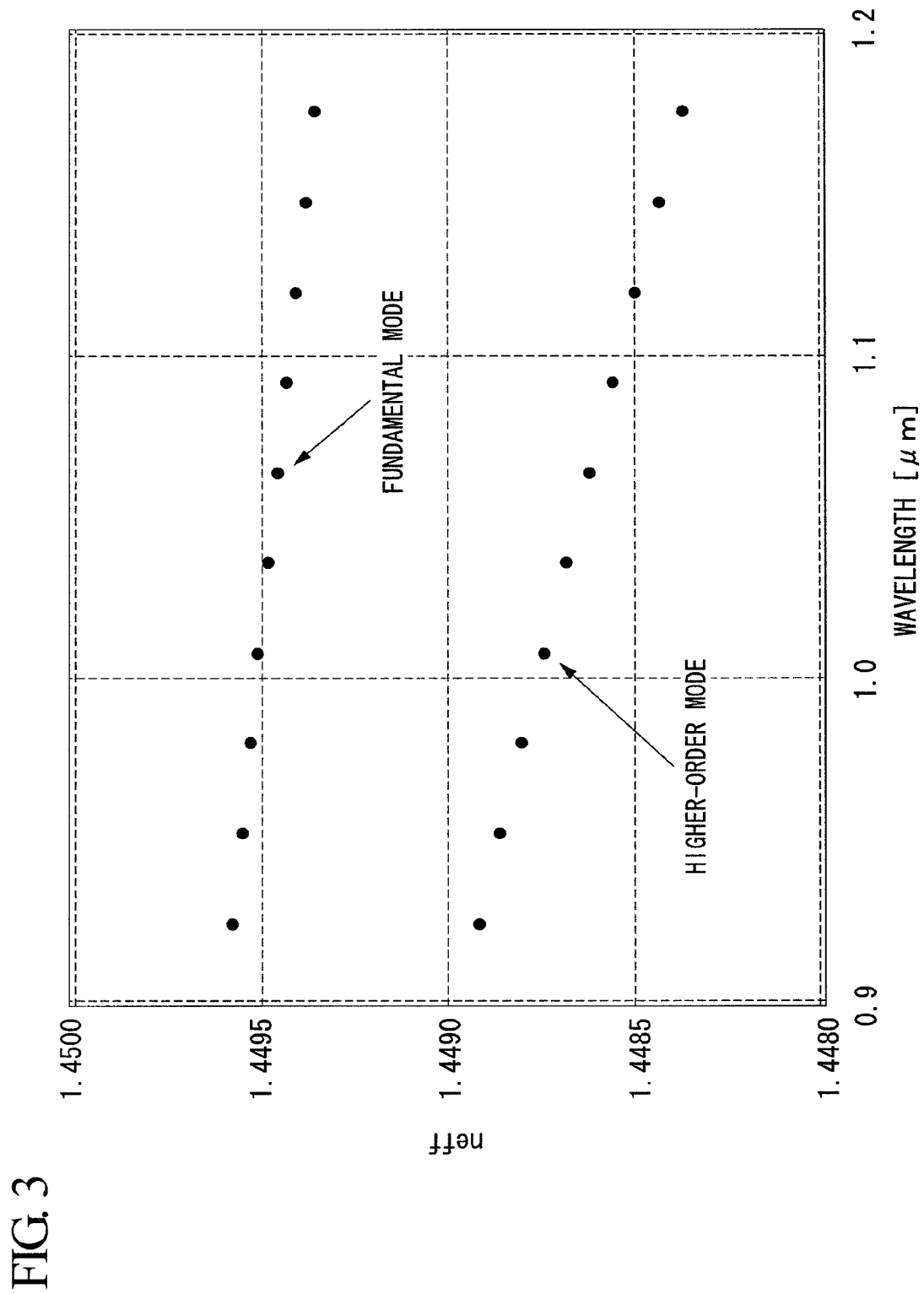
FIG. 3 shows dispersion curves of the fundamental mode and the LP11 mode in a fiber having no periodic structure portion.
Figure 4:
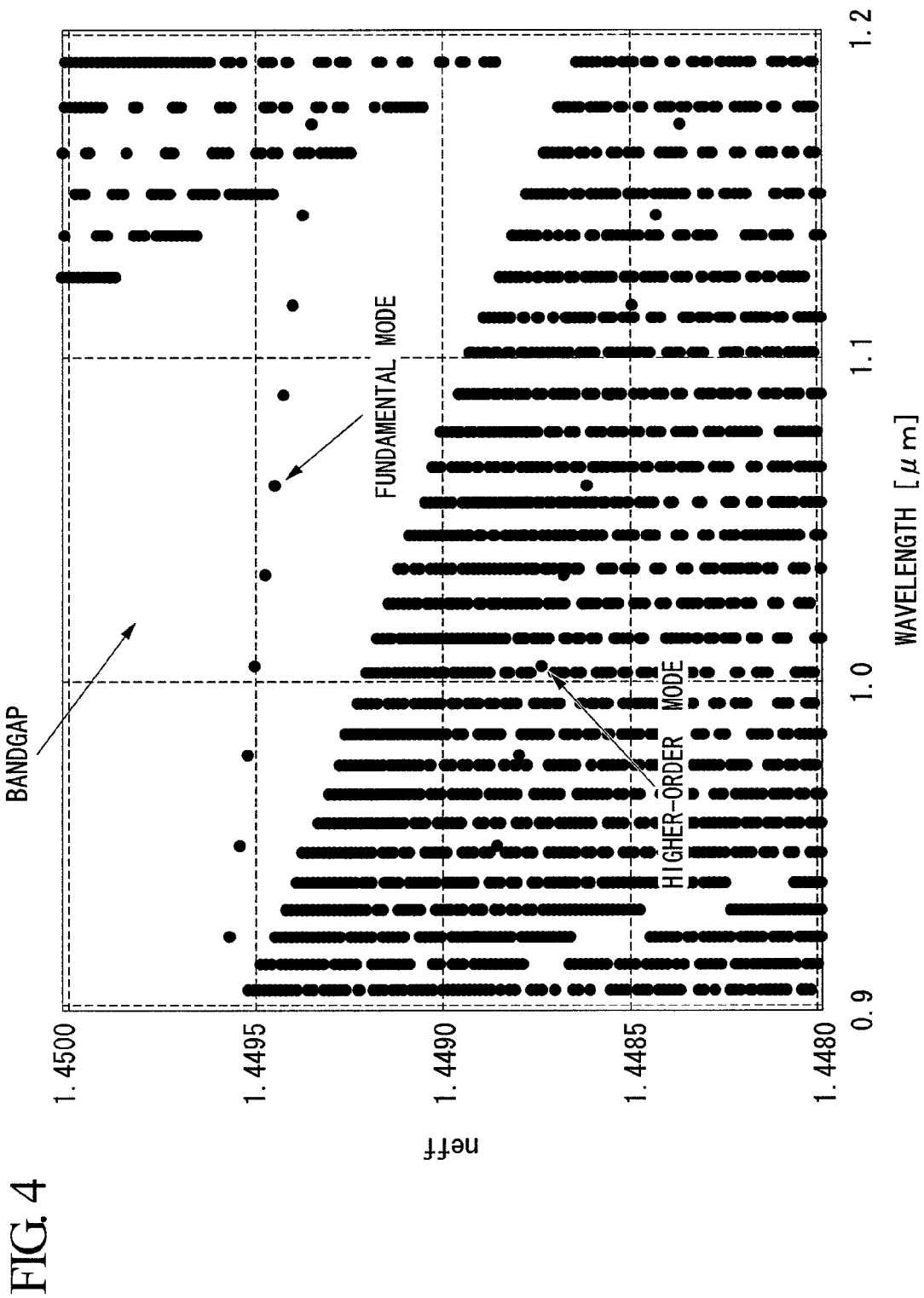
FIG. 4 is a band diagram illustrating the results of FIG. 2 and FIG. 3 in an overlapped manner.

FIG. 3 illustrates dispersion curves of modes guiding through a core in a fiber having a basic structure in which no periodic structure portion is provided around the second core 12. FIG. 2 illustrates a band diagram of the periodic structure. In the band diagram, a region having no point is a bandgap. In the fiber having a structure shown in FIG. 1 in which a core is surrounded by a periodic structure portion, at a wavelength at which a dispersion curve of a mode guiding through a core is within the bandgap, confinement effect with respect to the mode is generated due to the effect of the photonic bandgap. FIG. 4 illustrates the dispersion curves of the modes guiding through the core and the band diagram of the periodic structure in an overlapped manner. As will be apparent from the drawings, among the dispersion curves of the modes guiding through the core, only the dispersion curve of the fundamental mode exists within the bandgap, and the dispersion curve of the higher-order mode do not exist within the bandgap. For this reason, the fundamental mode is confined by the periodic structure, while the higher-order mode is not confined by the periodic structure. Therefore, the photonic bandgap fiber shown in FIG. 1 can selectively confine only the fundamental mode.

Figure 5:
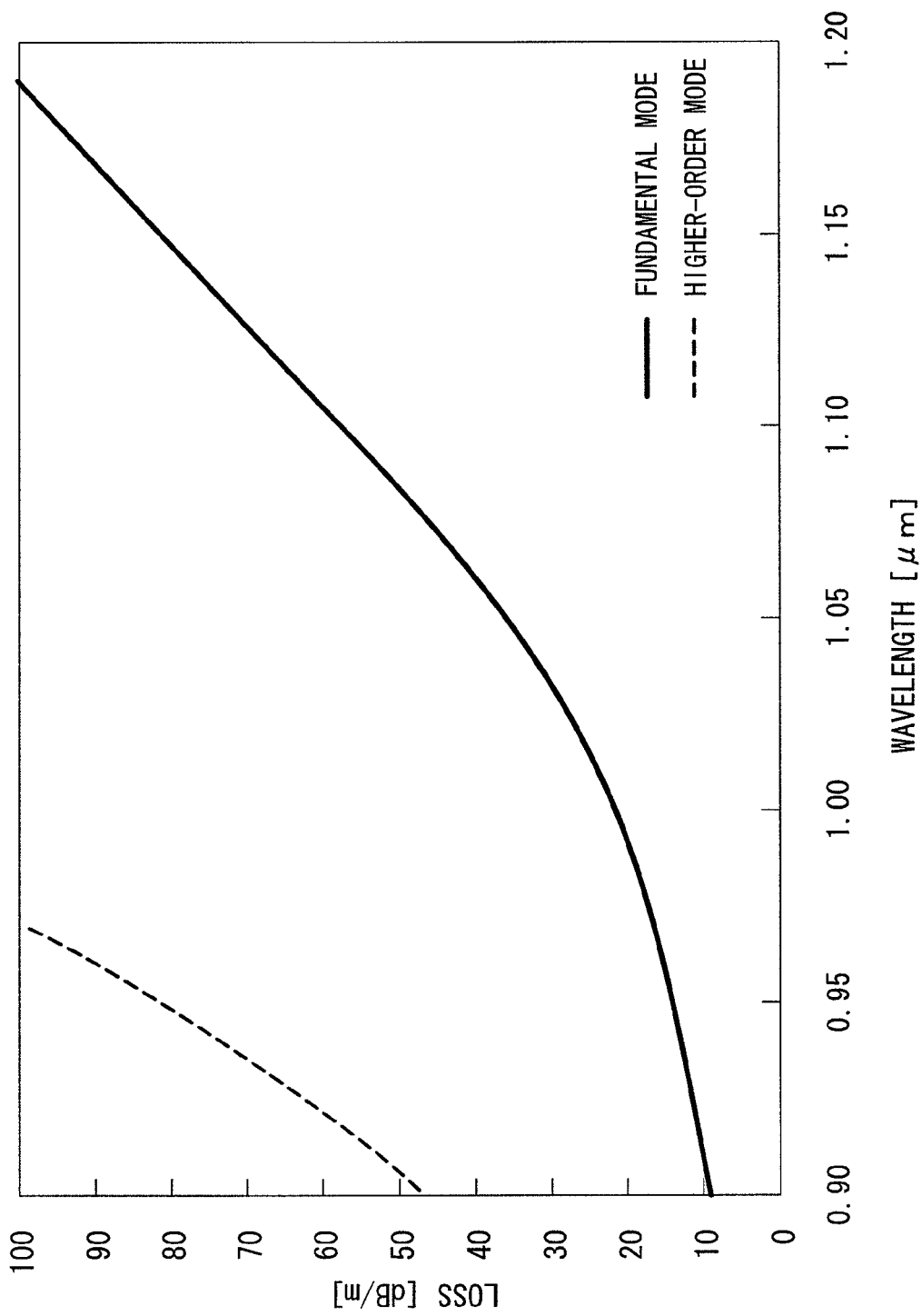
FIG. 5 is a graph illustrating calculation results of losses of the fundamental mode and the LP11 mode in the fiber having no periodic structure portion.

FIG. 5 illustrates calculation results of losses of modes guiding through a core in a fiber having a basic structure in which no periodic structure portion is provided around the second core 12. Both the loss of the fundamental mode and the loss of the higher-order mode are large.

Figure 6:
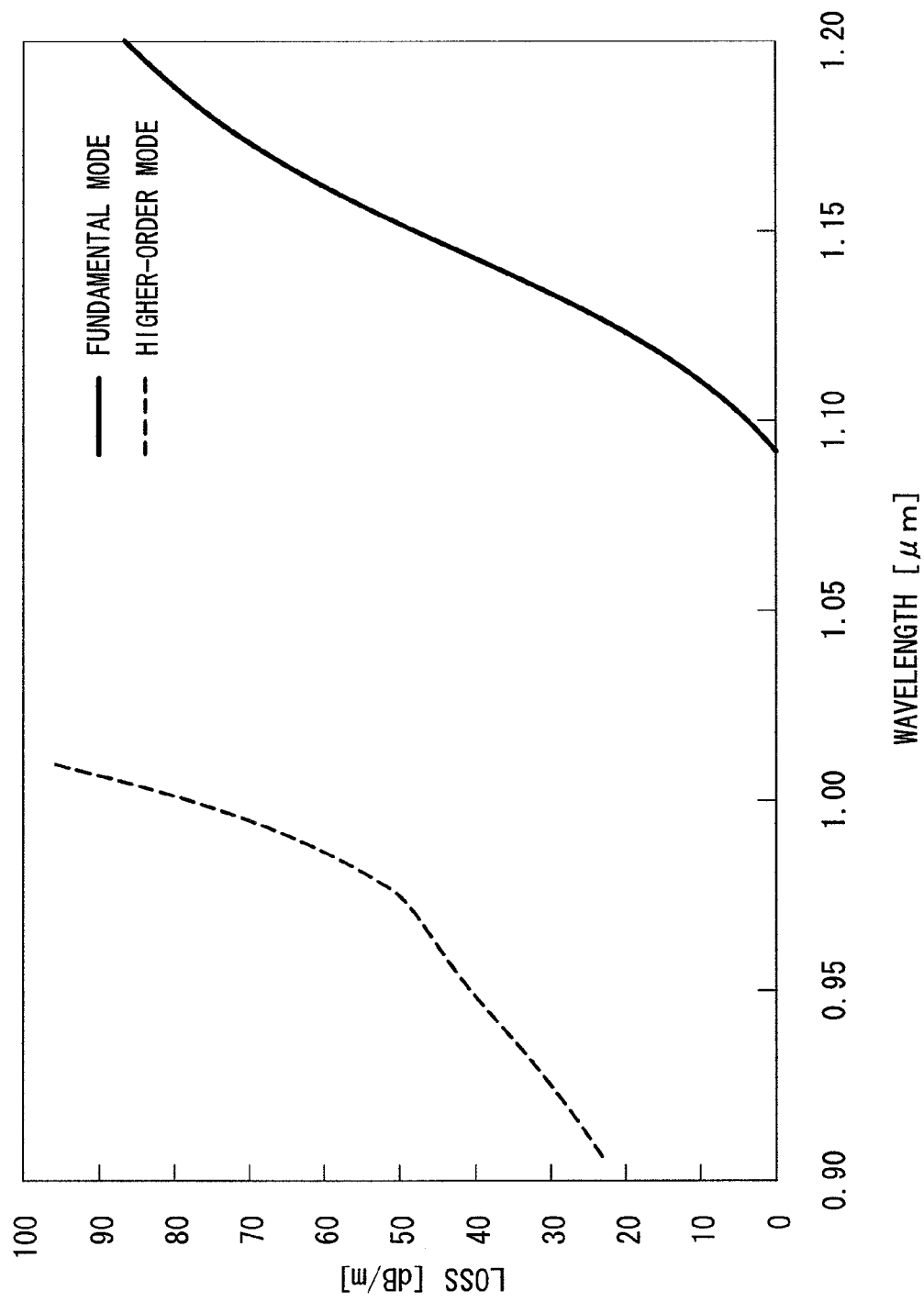
FIG. 6 is a graph illustrating calculation results of losses of the fundamental mode and the LP11 mode in the photonic bandgap fiber manufactured in Example 1.

On the other hand, FIG. 6 illustrates calculation results of losses of the fundamental mode and the higher-order mode in the fiber having the periodic structure portion shown in FIG. 1. As illustrated in FIG. 6, the loss of the fundamental mode rapidly decreases at a wavelength at which the dispersion curve of the fundamental mode is within the bandgap, while the loss of the higher-order mode is still large.

At a wavelength at which the dispersion curve of the fundamental mode is outside of the bandgap, the fundamental mode also has a large loss. This means that the fiber also has an effect of removing light at a wavelength other than signal light, for example, unnecessary ASE or stimulated Raman scattering. For example, when a fiber laser oscillates at a wavelength of 1.08 µm, stimulated Raman scattering appears around a wavelength of 1.14 µm. However, since the loss of the fundamental mode at a wavelength of 1.14 µm is 30 dB/m or more, the stimulated Raman scattering can be effectively suppressed.

Figure 7:
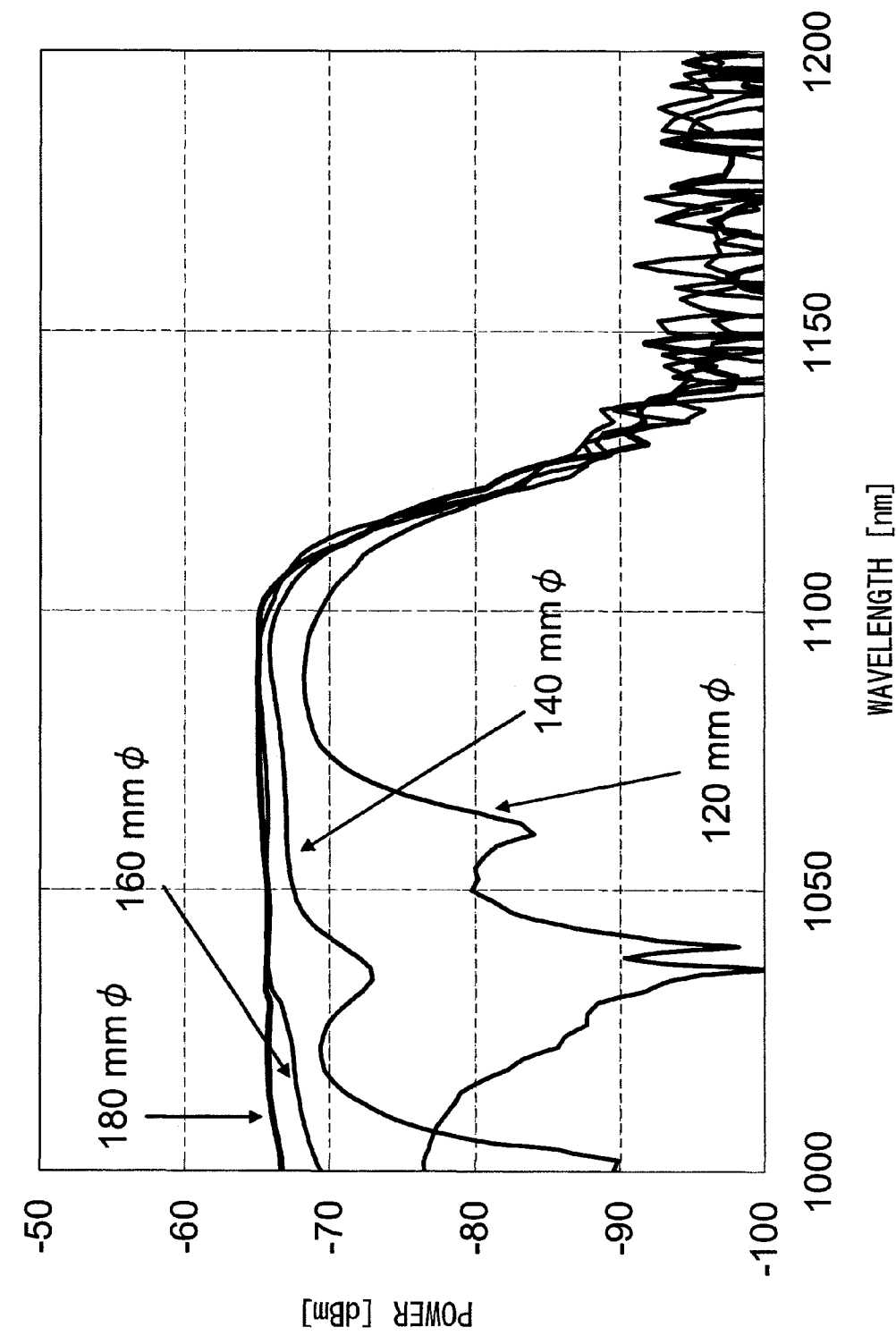
FIG. 7 is a graph illustrating measurement results of transmission bands in the photonic bandgap manufactured in Example 1.

Actually, a photonic bandgap fiber having the structure shown in FIG. 1 was prepared, the fiber was extracted by 1 m, and only the core portion of the extracted fiber was excited by light at a wavelength of 1.08 µm. In this case, only the fundamental mode was observed after 1 m propagation, and no higher-order mode was observed. FIG. 7 illustrates the measurement results of transmission bands when only the core portion was excited by white light. A bend diameter varied in the range of 120 mmϕ to 180 mmϕ. It can be seen that, when the bend diameter is within the range of 160 mmϕ to 180 mmϕ, light at a wavelength of 1.08 µm propagates, but light at a wavelength of 1.14 µm is attenuated by approximately 30 dB. Therefore, when a high-power fiber laser oscillates at a wavelength of 1.08 µm, the fiber of this example can effectively suppress the generation of stimulated Raman scattered light at a wavelength of 1.14 µm.

Figure 8:
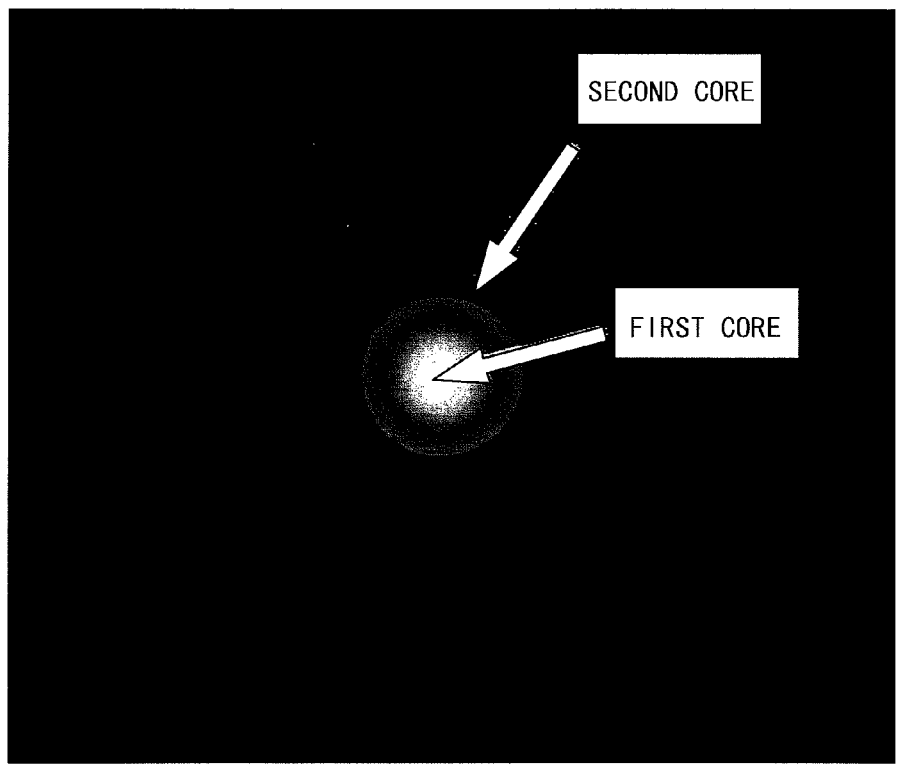
FIG. 8 is a diagram illustrating modes propagating through a first core in the photonic bandgap fiber manufactured in Example 1.
Figure 9:
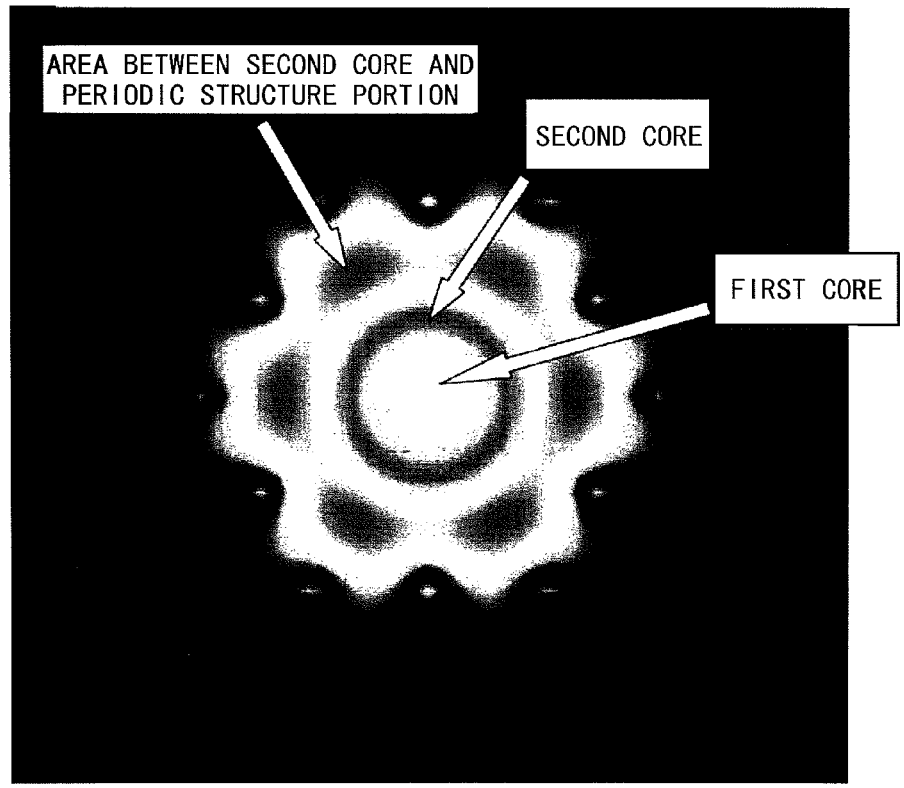
FIG. 9 is a diagram illustrating modes propagating through an area between a second core and a periodic structure portion in the photonic bandgap fiber manufactured in Example 1.

It can also be seen that, when the bend diameter is changed from 180 mmϕ to 120 mmϕ, the transmission characteristic in the range of 1.0 µm to 1.05 µm is significantly changed. This is because, when the fiber is bent to some extent, a mode shown in FIG. 8 propagating through the first core 11 is coupled to, for example, a mode shown in FIG. 9 primarily propagating through an area between the second core 12 and the periodic structure portion, and leaks out of the first core 11. Since confinement of a mode propagating through an area between the second core 12 and the periodic structure portion is weak, light is easily radiated to the cladding 10 due to bending or the like. For this reason, the propagation loss increases. Therefore, if the bend diameter of the fiber is appropriately set, unnecessary light at a wavelength ranging from 1.0 µm to 1.05 µm, such as ASE or parasitic oscillation, which frequently causes a problem in a fiber laser, can be attenuated.

EXAMPLE 2

Figure 10:
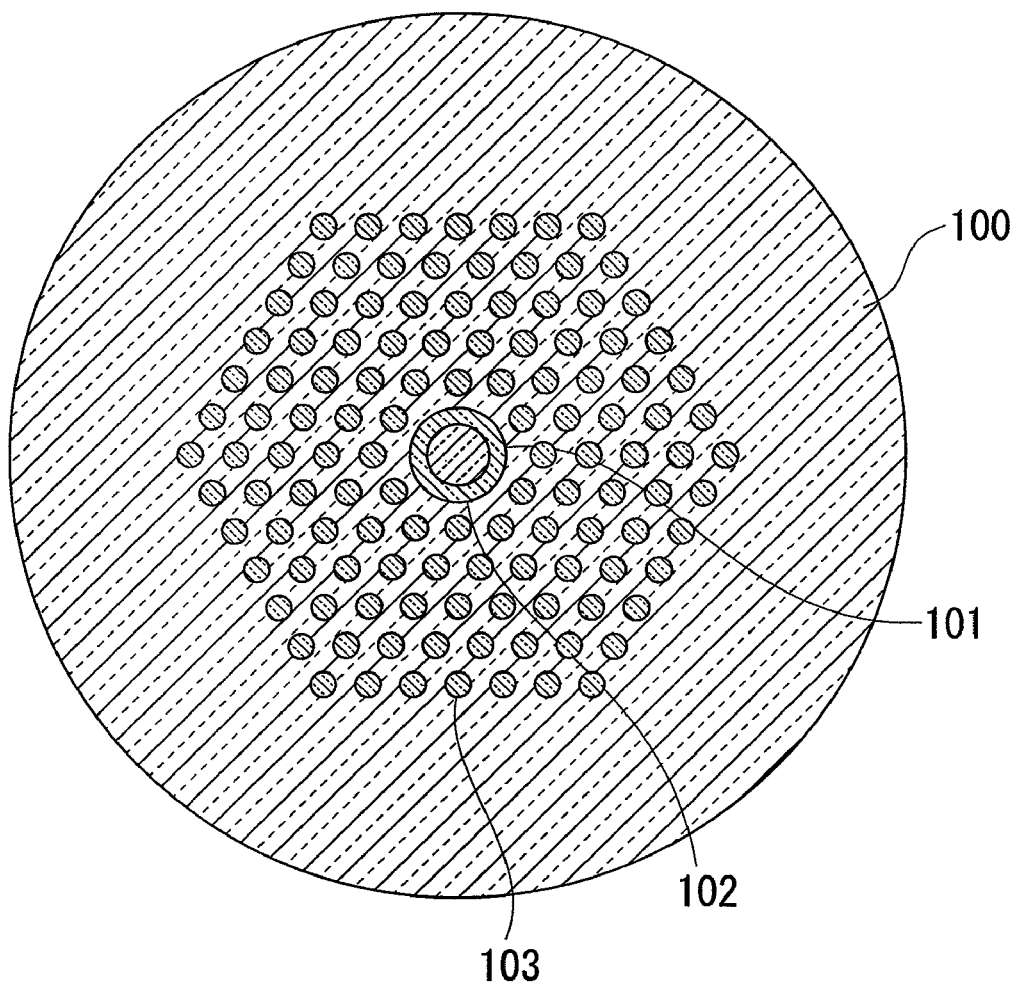
FIG. 10 is a sectional view of a photonic bandgap fiber manufactured in Example 2.

As another example of the invention, a photonic bandgap fiber having a structure shown in FIG. 10 was prepared. Within a cladding 100 made of pure quartz glass having a refractive index of 1.45, a first core 101 having a relative refractive-index difference $\Delta 1$ of 0.0% with respect to the cladding 100 and a diameter d1 of 12.0 µm is provided. A second core 102 having a relative refractive-index difference $\Delta 2$ of −0.36% with respect to the cladding 100 and a diameter d2 of 22.0 µm is provided around the first core 101. High-refractive index portions 103 having a relative refractive-index difference $\Delta h$ of 1.6% with respect to the cladding 100 and a diameter dh of 3.2 µm are arranged around the second core 102 to form a periodic structure which is a triangular lattice structure having a period of 9.0 µm (periodic structure portion). In the periodic structure, two layers at the center are not provided in order to form a core, and a five-layered periodic structure is formed.

Figure 11:
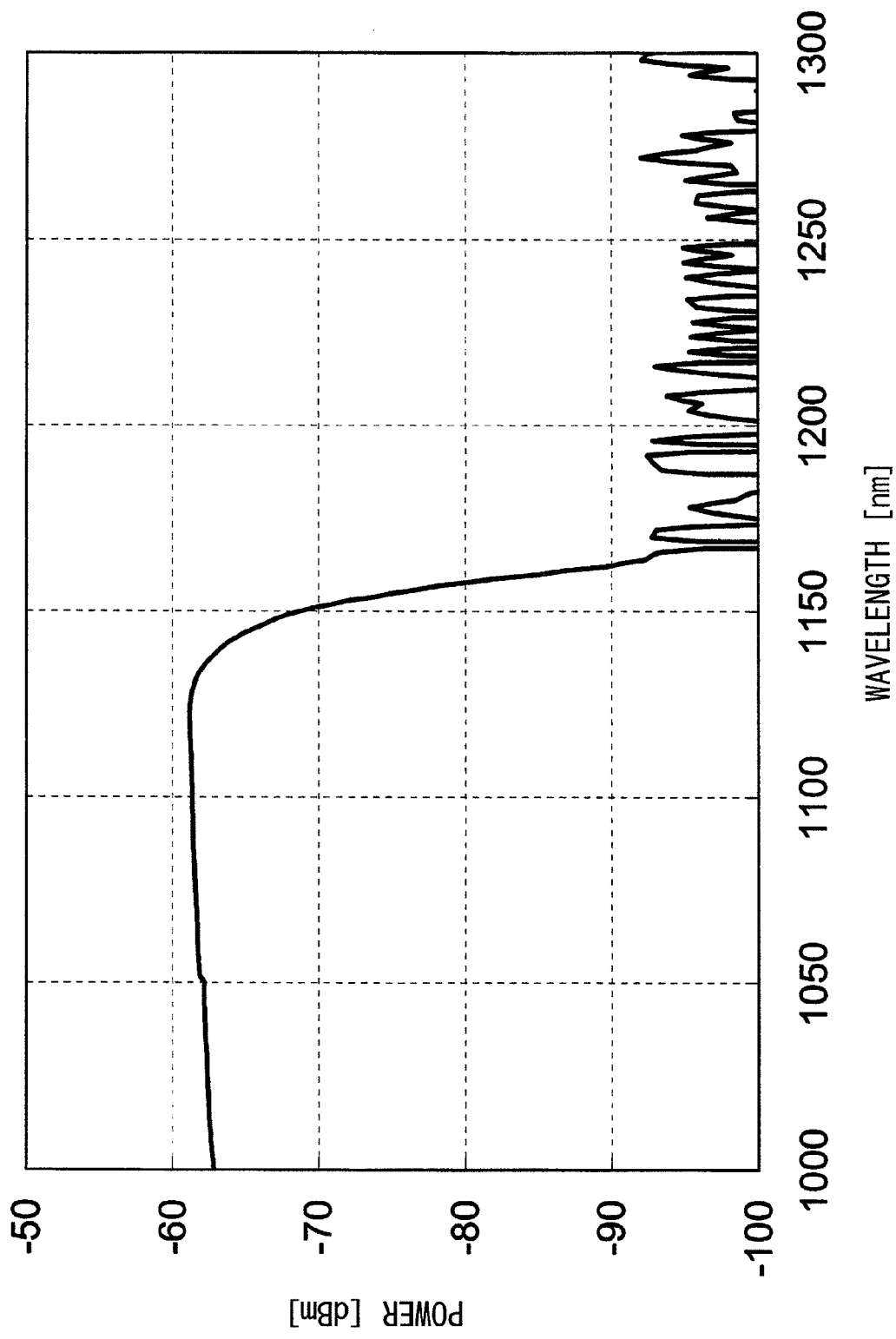
FIG. 11 is a graph illustrating a measurement result of a transmission band in the photonic bandgap fiber manufactured in Example 2.

The prepared fiber was extracted by 2 m, and only the core portion of the extracted fiber is excited by light at a wavelength of 1.06 µm in a state where the fiber was bent at a diameter of 200 mmϕ. In this case, only the fundamental mode was observed after 2 m propagation, and no higher-order mode was observed. FIG. 11 illustrates a measurement result of a transmission band when only the core portion is excited by white light. As illustrated in FIG. 11, the intensity of transmitted light rapidly decreases around a wavelength of 1.13 µm. For this reason, when laser light at a wavelength of 1.06 µm is incident, first-order stimulated Raman scattering around a wavelength of 1.12 µm is generated, but second-order or higher-order stimulated Raman scattering around a wavelength of 1.18 µm can be suppressed. Therefore, this fiber functions as a fiber capable of efficiently generating first-order stimulated Raman scattering.

This fiber is fusion-spliced to a known fiber having a concentric refractive index distribution and a mode field diameter similar to this fiber. In this case, at a wavelength of 1.06 µm, a fusion-splicing loss of 0.1 dB or less can be stably obtained. This is because the first core 101 of this fiber has a circular cross section, and the second core 102 has a thickness large enough to define the electric field distribution of the fundamental mode primarily by the shapes of the first core 101 and the second core 102 without being substantially influenced by the periodic structure portion, and has a thickness small enough to leak higher-order modes, which is not included in the photonic bandgap, to the cladding. For this reason, the electric field is concentric, and a connection loss due to a difference in the mode field shape can be reduced. As such, the photonic bandgap fiber of the invention can reduce connection loss to a known fiber.

EXAMPLE 3

Figure 12:
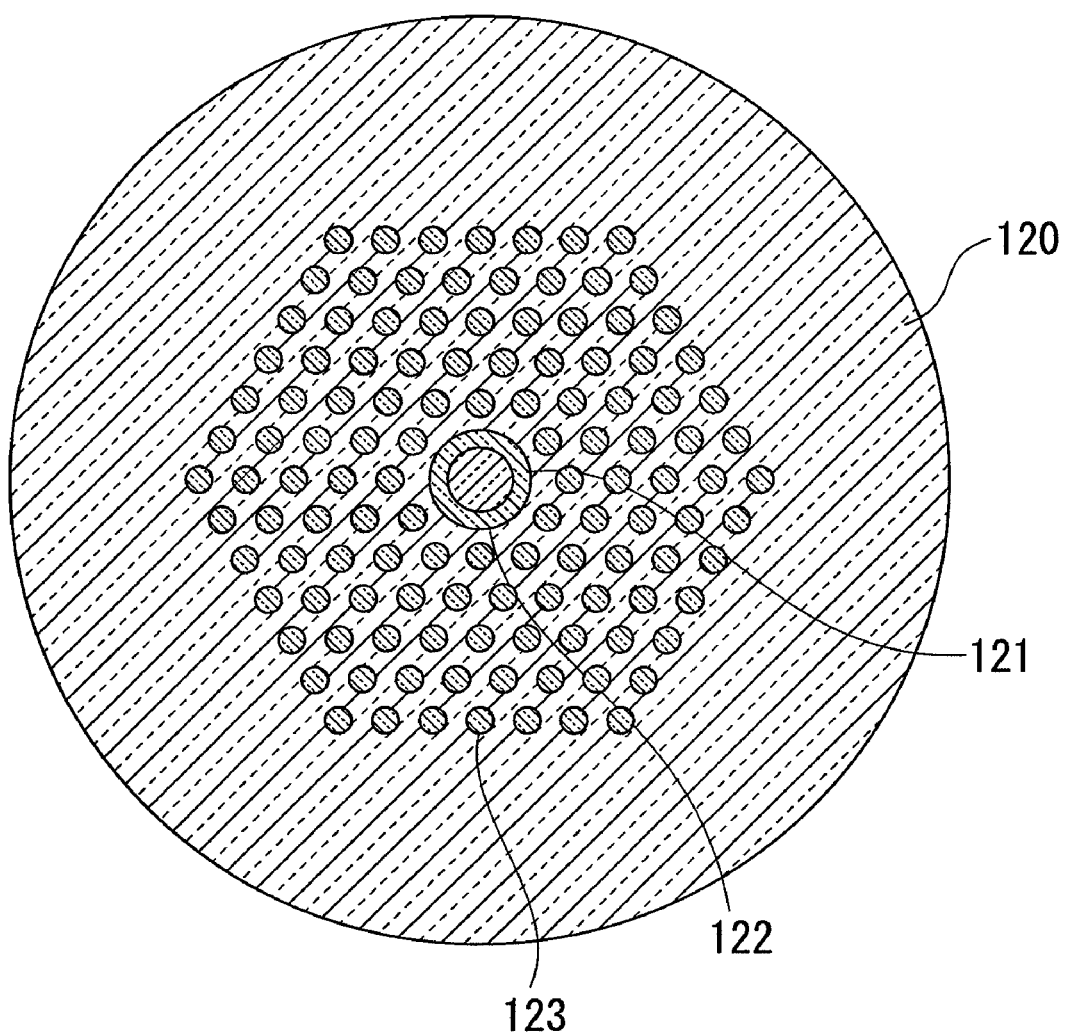
FIG. 12 is a sectional view of a photonic bandgap fiber manufactured in Example 3.

As another example of the invention, a photonic bandgap fiber having a structure shown in FIG. 12 was prepared. Within a cladding 120 made of pure quartz glass having a refractive index of 1.45, a first core 121 having a relative refractive-index difference $\Delta 1$ of 0.0% with respect to the cladding 120 and a diameter d1 of 29.0 µm is provided. A second core 122 having a relative refractive-index difference $\Delta 2$ of −0.36% with respect to the cladding 120 and a diameter d2 of 35.0 µm is provided around the first core 121. High-refractive index portions 123 having a relative refractive-index difference $\Delta h$ of 1.6% with respect to the cladding 120 and a diameter dh of 5.8 µm are arranged around the second core 122 to form a periodic structure which is a triangular lattice structure having a period of 14.5 µm (periodic structure portion). In the periodic structure, two layers at the center are not provided in order to form a core, and a five-layered periodic structure is formed.

Figure 13:
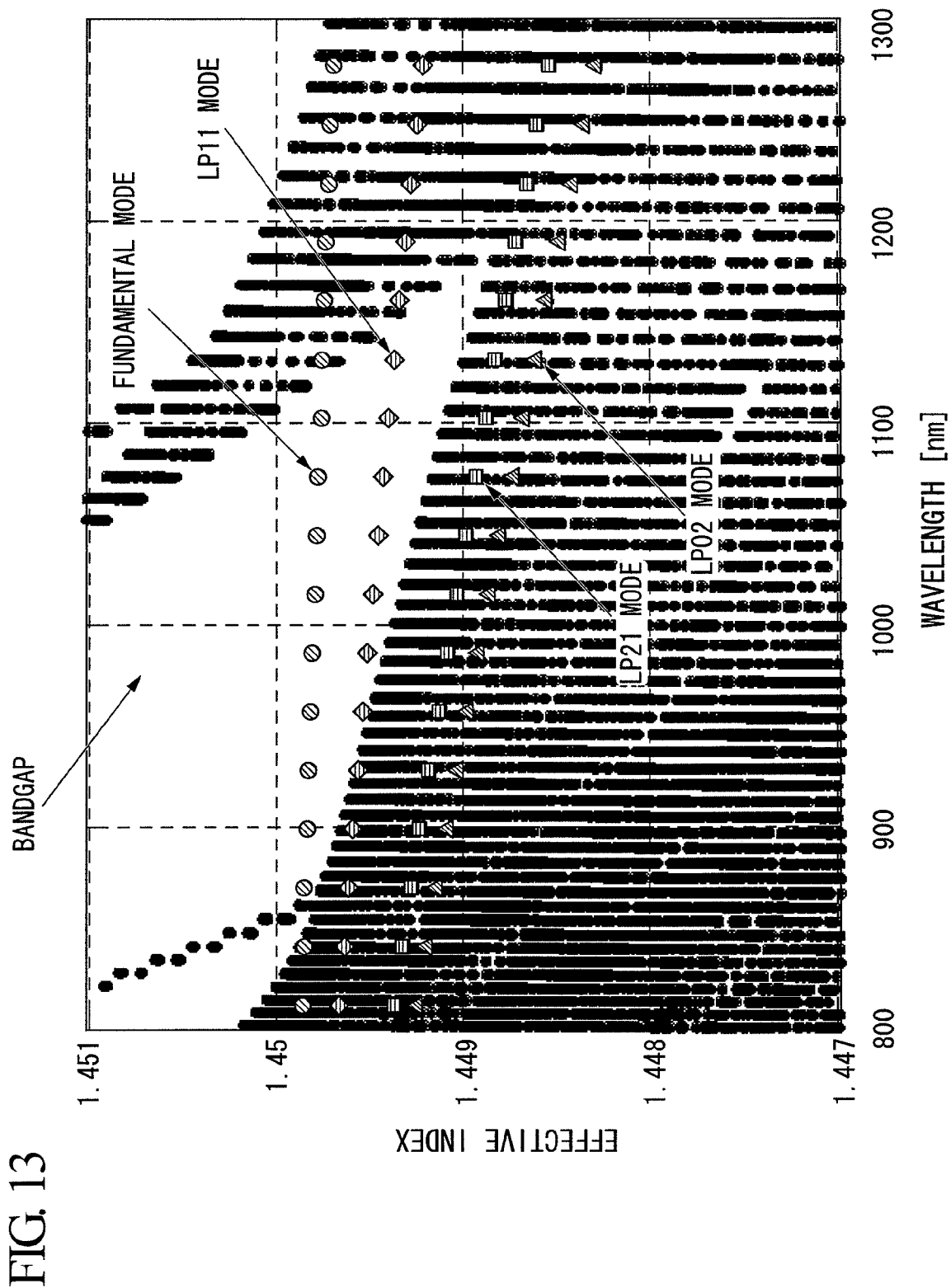
FIG. 13 is a diagram illustrating a band diagram of the photonic bandgap fiber manufactured in Example 3 and dispersion curves of the fundamental mode, the LP11 mode, the LP21 mode, and the LP02 mode in the fiber having no periodic structure portion in an overlapped manner.

FIG. 13 illustrates a band diagram of the periodic structure, and dispersion curves of the fundamental mode, the LP11 mode, the LP21 mode, and the LP02 mode in a fiber having a basic structure, in which no periodic structure portion exists around the second core 122, in an overlapped manner. As will be apparent from the drawing, the fundamental mode and the LP11 mode pass through the bandgap, but the LP21 mode and the LP02 mode do not exist in the bandgap. For this reason, the fundamental mode and the LP11 mode are confined by the periodic structure, but the LP21 mode and the LP02 mode are not confined. Therefore, if the photonic bandgap fiber of this example is connected to a fiber having a concentric mode field and excited, since the LP11 mode is not excited and only the fundamental mode is excited, only the fundamental mode substantially propagate.

Figure 14:
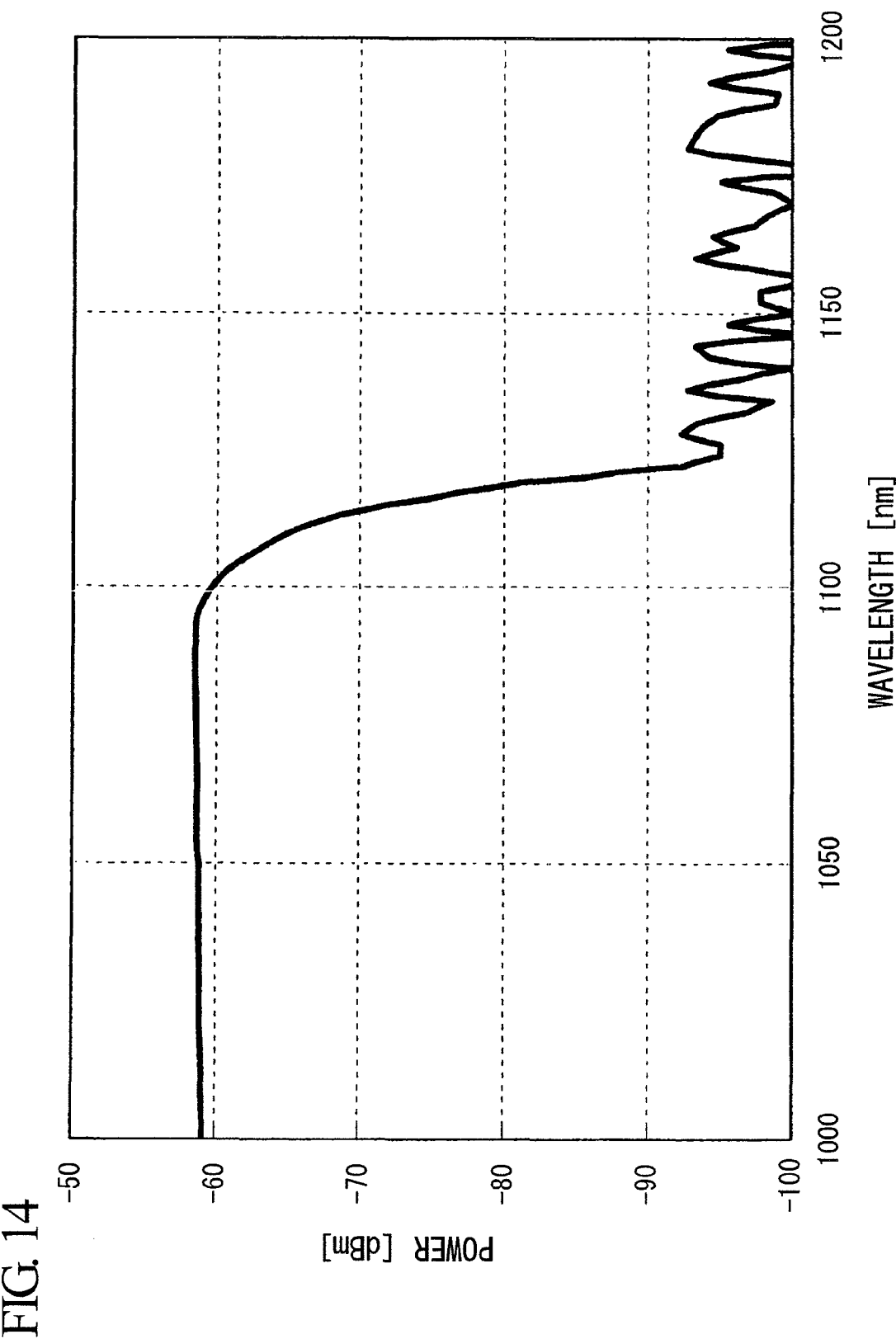
FIG. 14 is a graph illustrating a measurement result of a transmission band in the photonic bandgap fiber manufactured in Example 3.

The prepared fiber was extracted by 2 m, and only the core portion of the extracted fiber was excited by light at a wavelength of 1.08 µm using a single-mode fiber in a state where the fiber was bent at a diameter of 250 mmϕ. In this case, only the fundamental mode was observed after 2 m propagation, and no higher-order modes, such as the LP11 mode, the LP21 mode, and the LP02 mode, were observed. FIG. 14 illustrates a measurement result of a transmission band when only the core portion was excited by white light using the single-mode fiber. As shown in FIG. 14, the intensity of transmitted light rapidly decreases around a wavelength of 1.10 µm. For this reason, when high-power laser light at a wavelength of 1.08 µm is incident, first-order stimulated Raman scattering around a wavelength of 1.14 µm can be suppressed. In addition, when this fiber is used as an amplifying fiber with a core portion doped with rare earth, generation of first-order stimulated Raman scattering in the amplifying fiber can be suppressed.

This fiber is fusion-spliced to a known fiber having a concentric refractive index profile and a mode field diameter similar to this fiber. In this case, at a wavelength of 1.08 µm, a fusion-splicing loss of 0.1 dB or less can be stably obtained. Since the first core 121 of this fiber has a circular cross section, and the electric field distribution is defined primarily by the shape of the first core 121, the electric field distribution is concentric, and a connection loss due to a difference in the mode field shape can be reduced. As such, the photonic bandgap fiber of the invention can reduce connection loss with to a known fiber.

INDUSTRIAL APPLICABILITY

According to the photonic bandgap fiber of the invention, it is possible to reduce the propagation loss of the fundamental mode, and to increase the propagation loss of the higher-order modes whose propagation needs to be suppressed.

The invention claimed is:

1. A photonic bandgap fiber comprising:
a first core having a refractive index equal to or smaller than a refractive index of a cladding;
a second core that is provided to surround the first core and has a refractive index smaller than the refractive index of the first core;
the cladding that surrounds the second core; and
a periodic structure portion that is provided in the cladding around the second core, and in which high-refractive index portions having a refractive index larger than the refractive index of the cladding form a periodic structure,
wherein the periodic structure is configured such that at least the propagation constant of the fundamental mode at a wavelength to be used is in a photonic bandgap, and the propagation constant of a higher-order mode at the wavelength to be used is outside of the photonic bandgap.

2. The photonic bandgap fiber according to claim 1, wherein the periodic structure portion includes a plurality of the high-refractive index portions that are arranged to form a structure including at least one of a triangular lattice structure, a honeycomb lattice structure, a square lattice structure, and a rectangular lattice structure.

3. The photonic bandgap fiber according to claim 1, wherein the first core has a circular cross section.

4. The photonic bandgap fiber according to claim 1, wherein the high-refractive index portion, the first core, and the second core have no hole.

5. The photonic bandgap fiber according to claim 1, wherein the relative refractive-index difference of the first core with respect to the cladding is in the range of −1.0% to 0.0%, and the relative refractive-index difference of the second core with respect to the cladding is in the range of −1.5% to −0.01%.

6. The photonic bandgap fiber according to claim 1, wherein the maximum relative refractive-index difference of the high-refractive index portion with respect to the cladding is in the range of 0.5% to 4.0%.

* * * * *